United States Patent
Page (10) Patent No.: US 10,493,544 B2
(45) Date of Patent: Dec. 3, 2019

(54) SYSTEM AND METHOD FOR CUTTING COMPOSITE MATERIALS

(71) Applicant: Cessna Aircraft Company, Wichita, KS (US)

(72) Inventor: Billy Joe Page, Wichita, KS (US)

(73) Assignee: Textron Innovations, Inc., Providence, RI (US)

( * ) Notice: Subject to any disclaimer, the term of this patent is extended or adjusted under 35 U.S.C. 154(b) by 412 days.

(21) Appl. No.: 15/418,984

(22) Filed: Jan. 30, 2017

(65) Prior Publication Data

US 2017/0225246 A1    Aug. 10, 2017

Related U.S. Application Data

(60) Provisional application No. 62/291,930, filed on Feb. 5, 2016.

(51) Int. Cl.
| | |
|---|---|
| *B23D 59/00* | (2006.01) |
| *B23D 51/04* | (2006.01) |
| *B23D 51/08* | (2006.01) |
| *G05B 19/18* | (2006.01) |

(52) U.S. Cl.
CPC ........... *B23D 59/002* (2013.01); *B23D 51/04* (2013.01); *B23D 51/08* (2013.01); *B23D 59/008* (2013.01); *G05B 19/182* (2013.01); *G05B 2219/36086* (2013.01)

(58) Field of Classification Search
CPC .... B23D 59/002; B23D 51/08; B23D 59/008; B23D 51/04; B21D 53/00

USPC ..................... 83/72, 375, 452, 782
See application file for complete search history.

(56) References Cited

U.S. PATENT DOCUMENTS

| | | | | |
|---|---|---|---|---|
| 3,871,258 | A * | 3/1975 | Hurn ....................... | B27B 1/002 83/210 |
| 4,106,181 | A * | 8/1978 | Mattchen ................. | A61C 3/12 279/77 |
| 4,269,241 | A * | 5/1981 | Hickman ................. | A01G 3/08 144/24.13 |
| 4,659,903 | A * | 4/1987 | Berne .................... | B23K 9/032 219/125.11 |
| 4,790,224 | A * | 12/1988 | Krutilla ................ | B26D 7/0608 198/345.2 |
| 4,817,245 | A * | 4/1989 | Melville .............. | B23D 45/068 452/148 |

(Continued)

*Primary Examiner* — Sean M Michalski
(74) *Attorney, Agent, or Firm* — Erise IP, P.A.

(57) ABSTRACT

Embodiments of this disclosure provide a system and method for cutting composite materials. The system includes a material supporting surface, an oscillating saw suspended from a rotatable head on an arm, a two-axis gimbal coupled to the rotatable head for adjusting a cutting angle of the oscillating saw, and a material clamp for clasping the composite material to prevent the composite material from slipping while being cut with the oscillating saw. An automated embodiment of the system further includes a controller for instructing the oscillating saw to cut the composite material by guiding the saw via coordinated movement of the rotatable head, the arm, and the gimbal. A method of cutting a woven composite material includes feeding the material on a support surface, providing an oscillating saw blade on a guiding mechanism, and cutting the material by moving the saw blade in a direction based on the guiding mechanism.

19 Claims, 13 Drawing Sheets

(56) References Cited

U.S. PATENT DOCUMENTS

| | | | | |
|---|---|---|---|---|
| 5,093,552 A * | 3/1992 | Torii | B23K 26/0884 | 219/121.62 |
| 5,221,823 A * | 6/1993 | Usui | B23K 26/0884 | 219/121.63 |
| 5,403,276 A * | 4/1995 | Schechter | A61B 17/32002 | 604/118 |
| 5,524,328 A * | 6/1996 | Hardesty | B23Q 1/012 | 144/250.14 |
| 5,699,707 A * | 12/1997 | Campbell, Jr. | B26D 7/018 | 198/689.1 |
| 5,791,215 A * | 8/1998 | Morrison | B26D 5/32 | 700/167 |
| 5,979,519 A * | 11/1999 | Susnjara | B23H 1/00 | 144/135.2 |
| 6,332,890 B1 * | 12/2001 | Ortega | A61F 9/013 | 606/166 |
| 7,272,882 B1 * | 9/2007 | Onsrud | B23Q 3/002 | 29/564 |
| 7,666,065 B2 * | 2/2010 | Langenbach | B23C 1/002 | 451/11 |
| 8,651,780 B2 * | 2/2014 | Katzenberger | B23Q 9/0042 | 408/95 |
| 9,737,940 B2 * | 8/2017 | Ono | B23D 47/04 | |
| 9,955,702 B1 * | 5/2018 | Driscoll | A22B 5/208 | |
| 2001/0041524 A1 * | 11/2001 | Steiger | B23D 61/006 | 451/356 |
| 2002/0104421 A1 * | 8/2002 | Wurst | B23D 61/006 | 83/835 |
| 2003/0032971 A1 * | 2/2003 | Hausmann | B23D 61/006 | 606/176 |
| 2004/0069106 A1 * | 4/2004 | McAdoo | B27B 5/207 | 83/34 |
| 2004/0211305 A1 * | 10/2004 | Scholz | B23D 45/042 | 83/452 |
| 2005/0076759 A1 * | 4/2005 | Westfall | B23D 45/14 | 83/47 |
| 2005/0147476 A1 * | 7/2005 | Wieners | B26D 3/085 | 408/21 |
| 2006/0099899 A1 * | 5/2006 | Hazenbroek | A22C 21/0092 | 452/161 |
| 2006/0219073 A1 * | 10/2006 | Urmson | B23D 45/024 | 83/469 |
| 2007/0275648 A1 * | 11/2007 | Sato | A22B 5/0041 | 452/157 |
| 2007/0295156 A1 * | 12/2007 | Ziegler | B24B 23/04 | 74/594.1 |
| 2009/0013540 A1 * | 1/2009 | Bohne | B23D 61/006 | 30/388 |
| 2010/0064869 A1 * | 3/2010 | Poole | B27B 27/04 | 83/72 |
| 2011/0016720 A1 * | 1/2011 | Plaskett | B28D 1/04 | 29/897.3 |
| 2011/0072946 A1 * | 3/2011 | Bernardi | B25F 5/00 | 83/522.11 |
| 2011/0316241 A1 * | 12/2011 | Zhang | B23D 61/006 | 279/143 |
| 2013/0133489 A1 * | 5/2013 | Este | B26D 5/007 | 83/13 |
| 2013/0205564 A1 * | 8/2013 | Dick | B27B 27/10 | 29/428 |
| 2016/0059363 A1 * | 3/2016 | Ardisson | B23K 37/0288 | 219/121.39 |
| 2016/0129589 A1 * | 5/2016 | Liang | G05B 19/416 | 700/254 |
| 2017/0049116 A1 * | 2/2017 | Driscoll | A22B 5/0041 | |
| 2017/0076834 A1 * | 3/2017 | Okuno | B21D 53/00 | |
| 2017/0341259 A1 * | 11/2017 | Underwood | B27B 31/00 | |
| 2018/0022060 A1 * | 1/2018 | Downs | B32B 5/08 | 89/36.02 |
| 2018/0141141 A1 * | 5/2018 | Mihailescu | B23D 47/042 | |
| 2018/0153179 A1 * | 6/2018 | Driscoll | A22B 5/0041 | |
| 2018/0244392 A1 * | 8/2018 | Smith | B29C 70/46 | |
| 2019/0111517 A1 * | 4/2019 | Muratani | B23K 26/14 | |

* cited by examiner

SYSTEM AND METHOD FOR CUTTING COMPOSITE MATERIALS

CROSS-REFERENCE TO RELATED APPLICATIONS

This application claims priority to U.S. Provisional Application Ser. No. 62/291,930 entitled "Cutting Device for Composite Tooling Materials" and filed Feb. 5, 2016. The aforementioned application is incorporated by reference in its entirety.

BACKGROUND

The disclosed embodiments relate generally to the field of processing composite materials. More specifically, the invention relates to the cutting of composite tooling structures, wherein the structures comprise a woven material.

It is known to use saw-type arrangements for the purpose of cutting composite materials. For example, hand-held oscillating saws have been used for this purpose.

SUMMARY

In an embodiment, a system for cutting a composite material is provided. The system includes a material supporting surface; an oscillating saw suspended from a rotatable head on an arm; a two-axis gimbal coupled to the rotatable head for adjusting a cutting angle of the oscillating saw; and, a material clamp for clasping the composite material to prevent the composite material from slipping while being cut with the oscillating saw.

In another embodiment, an automated system for cutting a composite material is provided. The automated system includes a material supporting surface; an oscillating saw suspended from a rotatable head on an arm; a two-axis motorized gimbal coupled to the rotatable head for adjusting a cutting angle of the oscillating saw; and a controller having a memory, including a non-transitory medium for storing software, and a processor for executing instructions of the software, the software comprising instructions to cut the composite material by guiding the oscillating saw via coordinated movement of the rotatable head, the arm, and the two-axis motorized gimbal.

In yet another embodiment, a method of cutting a woven composite material that includes layered strips of quazi-isotropic material is provided. The method includes the steps of feeding the woven composite material on a support surface; positioning an oscillating saw via a guiding mechanism; and, cutting the woven composite material by moving a blade of the oscillating saw in a direction based on the guiding mechanism.

BRIEF DESCRIPTION OF THE SEVERAL VIEWS OF THE DRAWINGS

Illustrative embodiments of the present invention are described in detail below with reference to the attached drawing figures, which are incorporated by reference herein and wherein.

DETAILED DESCRIPTION

Embodiments of the present disclosure provide a system and method for cutting composite materials, such as composite laminates preimpregnated with resin, which are also known as prepreg layups. Cutting prepreg layup material is conventionally performed using a hand-held oscillating saw, which is labor intensive, ergonomically challenging, and offers limited precision. Layup material is typically cut at a cross-sectional angle to provide a beveled edge for overlapping with adjoining pieces, which ensures a strong post-cure bond therebetween. However, cutting layup material at an angle is particularly challenging using a hand-held saw.

A tooling surface used to form conventional composite parts may itself include composite laminates that are cured to form a facing material of the tooling surface. The cured facing material of the tooling surface is generally durable and impermeable, and has a coefficient of thermal expansion that is matched with that of the composite material of the part to be formed on the tooling surface. This provides a substantial performance advantage and cost savings compared to alternative metallic tooling materials (e.g., Invar metal). The composite laminates used to form the tooling surface may include layered strips of woven quazi-isotropic prepreg layup, such as HexTOOL® M61, a product manufactured by Hexcel Corporation located in Stamford, Conn. The product is impregnated with graphite material and may be consolidated into refrigerated rolls, which are warmed (e.g., partially or fully to room temperature) prior to cutting.

What is needed is a system and method for versatile cutting of prepreg layups, including tooling surface materials, with increased precision and decreased system maintenance.

Figure 1:
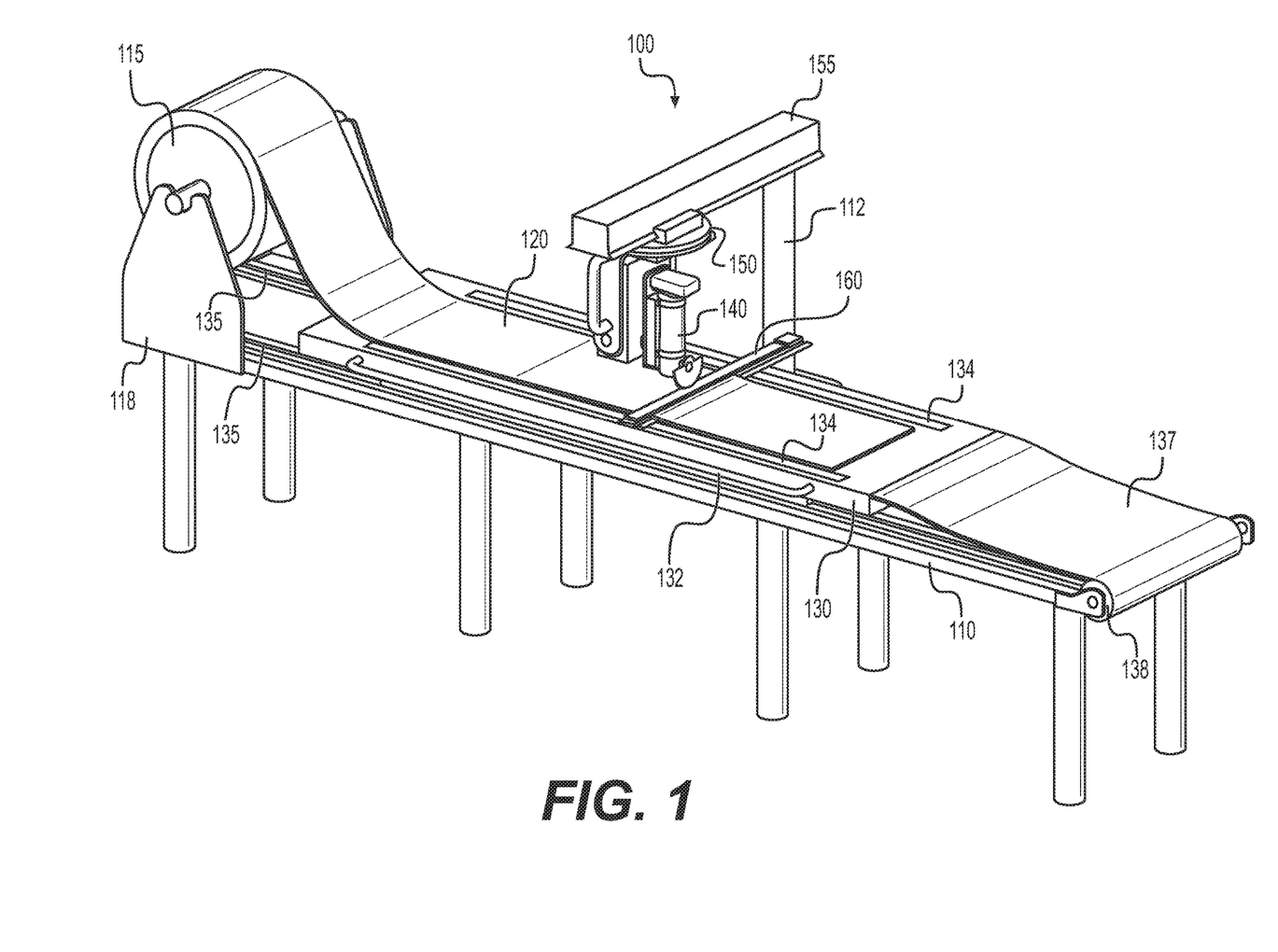
FIG. 1 is a perspective view of a system for cutting composite materials, in an embodiment.

FIG. 1 is a perspective view of an exemplary system for cutting composite materials, including a cutting device 100 mounted to a table 110 for cutting a composite material 120. Example composite materials include composite laminates, prepreg layups, and composite tooling materials. Note that cutting device 100 may be used to cut any material that is otherwise difficult to cut, including non-composite materials. Composite material 120 may be provided on a roll 115 or as a flat sheet that is loaded onto a material bed 130. Material bed 130 may include any surface configured for supporting material 120. Roll 115 may be mounted on a rack 118 for distributing material 120 to material bed 130.

For orienting the reader, composite material 120 may be fed from the first end of material bed 130 (e.g., the end nearest roll 115) towards a second end of material bed 130 (e.g., opposite the first end) in a longitudinal direction. As depicted in FIG. 1, a head assembly guide 155 is oriented across material bed 130 in a transverse direction that is perpendicular to the longitudinal direction.

One or more rails 135 may be mounted to table 110 in the longitudinal direction for supporting material bed 130, such that material bed 130 is longitudinally moveable along the one or more rails 135. A bed handle 132 is mechanically coupled to material bed 130 for an operator to move bed 130 along the one or more rails 135. Alternatively, a motorized mechanism may be employed for automatically moving material bed 130 along the one or more rails 135 under control of a controller, as further described below in connection with FIG. 12.

Cutting device 100 includes a saw 140 mechanically coupled to, and suspended from, a head assembly 150, which is slidably coupled to head assembly guide 155. Saw 140 may be any type of powered saw configured for cutting material, such as an oscillating trim saw, jig saw, etc. In an embodiment, saw 140 is an oscillating multifunction power tool (e.g., item 62279 from Chicago Electric Power Tools). Head assembly guide 155 includes an arm pivotably mounted to table 110 via a post 112. Alternatively, head assembly guide 155 may be pivotably mounted to a stand, a bench, or a separate table, without departing from the scope hereof. The height of head assembly guide 155 above material bed 130 may be adjustable by adjusting the height of post 112 or by adjusting the mounting position of head assembly guide 155 to post 112.

A clamp arrangement, such as a material clamp for example, may be used to secure composite material 120 while cutting. In certain embodiments, a material clamp 160 is aligned transversely across material bed 130 and configured for holding material 120 in place while cutting, as further described below in connection with FIGS. 10 and 11. Electromagnetic strips 134 may be located on a top side of, and aligned longitudinally along edges of, material bed 130 for maintaining material clamp 160 in contact with material bed 130, as further described below. A way cover 137 may extend from a second end of material bed 130 to a roller 138 for receiving composite material 120 after being cut by cutting device 100.

Figure 2:
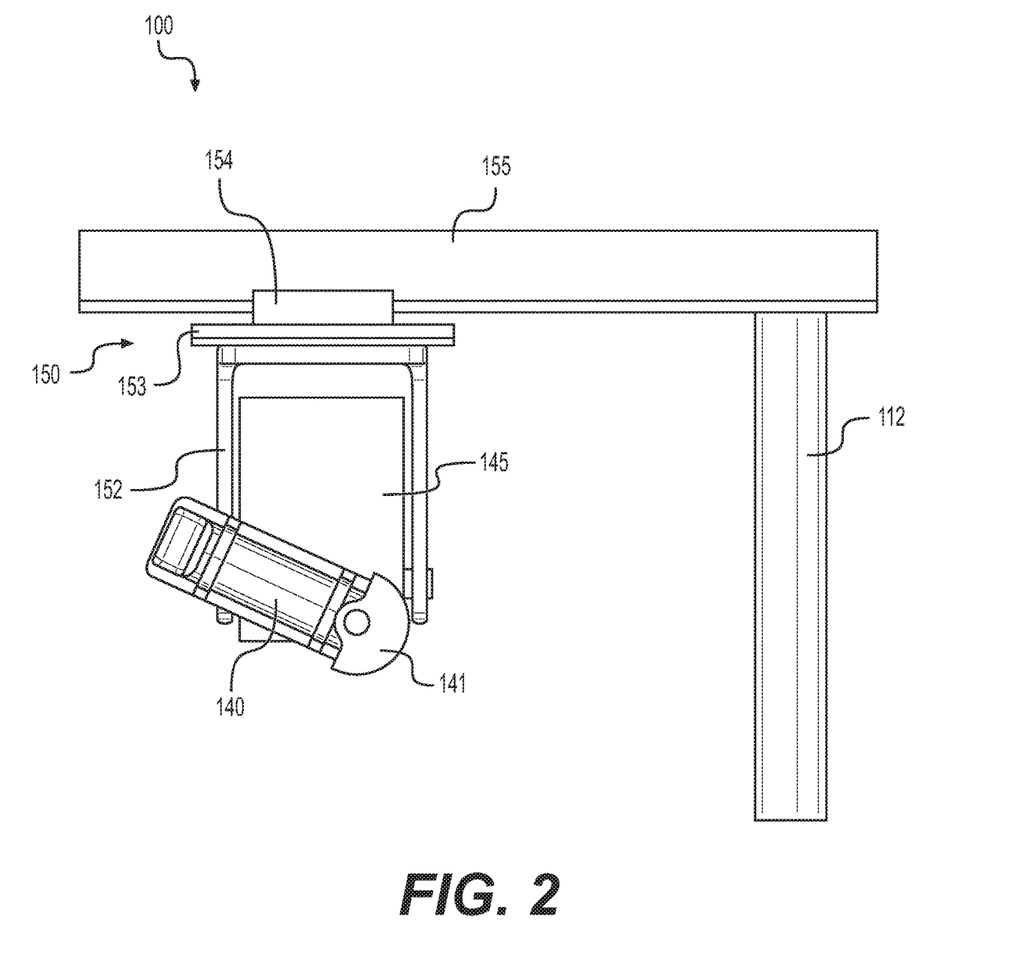
FIG. 2 is a side view of a cutting device of the system of FIG. 1 having a saw rotated to a first position.
Figure 3:
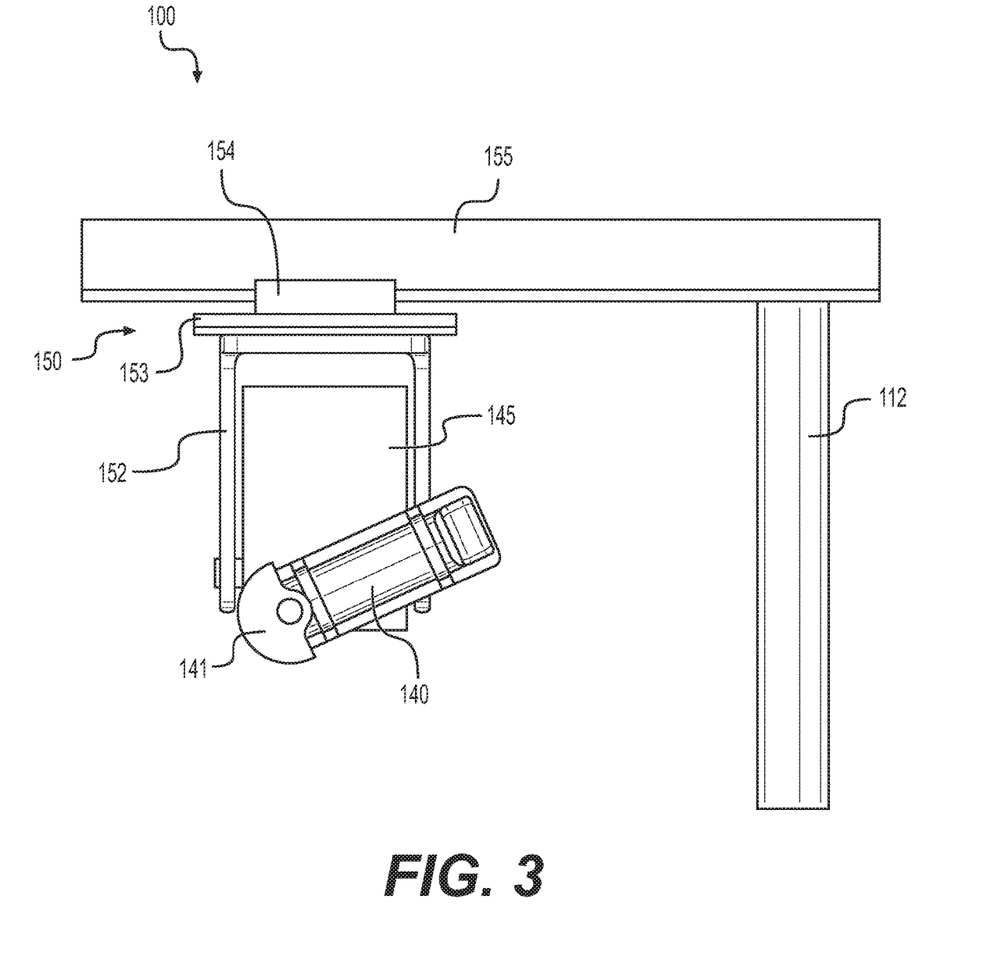
FIG. 3 is another side view of the cutting device of FIG. 2 with the saw rotated to a second position, opposite the first position.

FIGS. 2 and 3 are side views of cutting device 100, and are best viewed together with the following description. Head assembly 150 includes a mounting plate 154 for mounting to head assembly guide 155, and a head rotation plate 153 for rotating a mounting arm 152. A two-axis gimbal 145 is rotatably mounted about a pivoting member 146 within mounting arm 152, as further described below. Saw 140, which includes an oscillating blade 141, is rotatably mounted to the two-axis gimbal 145. In embodiments, gimbal 145 is a two-axis controller that contains a gear box or transmission (not shown), which enables the rotation of the saw 140 to be controlled along two perpendicular axes. More specifically, signals transmitted will enable a motor (not shown) to cause the gear box to rotate saw 140 along a first axis and a second axis, perpendicular to the first axis.

Rotation of saw 140 between the positions shown in FIGS. 2 and 3 enables all portions of a cutting edge of blade 141 to be used while cutting material. For example, the cutting edge of blade 141 may approximately form a half circle, yet only a portion of the half circle engages material 120 at any instant while cutting. Rotation of saw 140 may be used to prevent gumming of blade 141, as further described below in connection with method 300. The depth that blade 141 cuts through material 120 may be altered by adjusting the height of head assembly guide 155 along post 112.

Figure 4:
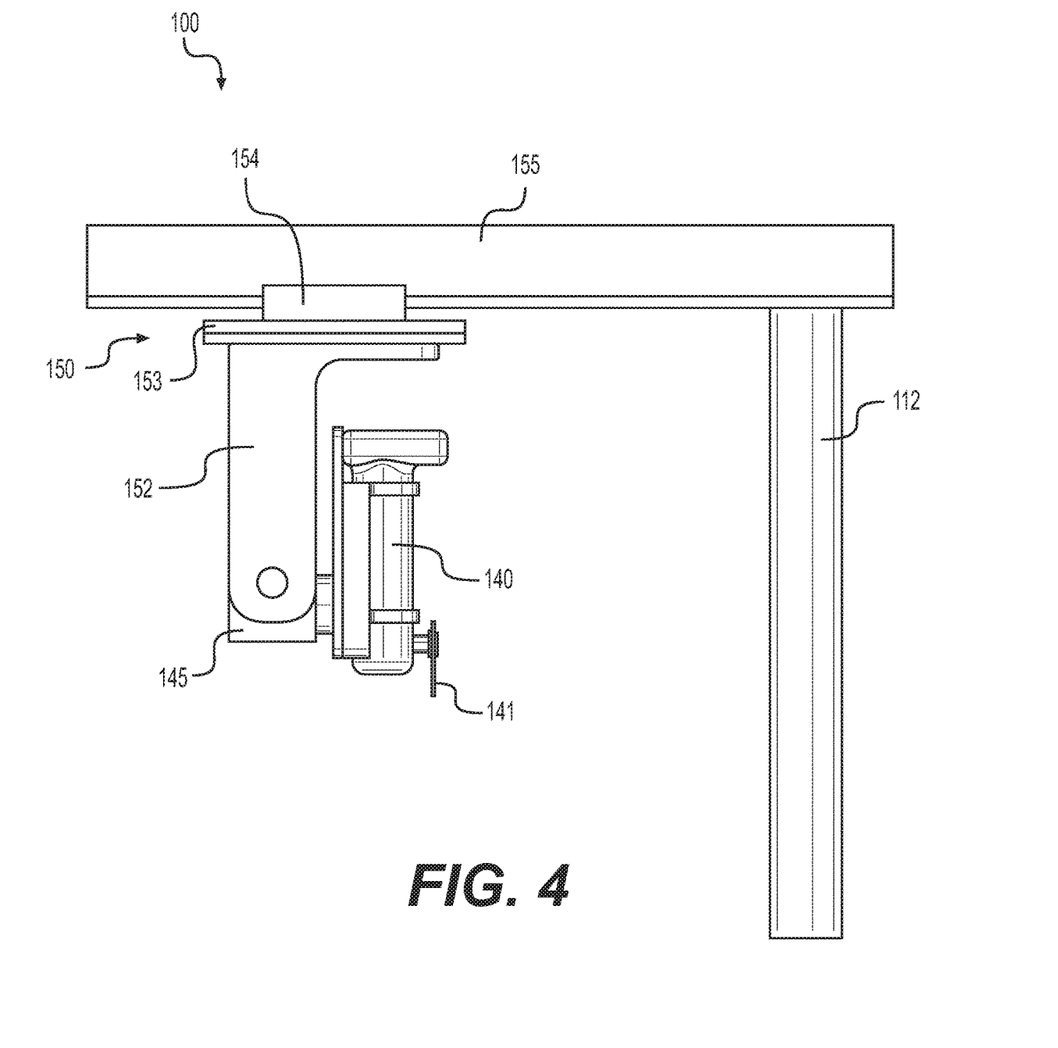
FIG. 4 is another side view of the cutting device of FIG. 2 with a head assembly rotated about ninety degrees from the orientation shown in FIGS. 2 and 3.

FIG. 4 is a side view of cutting device 100 with head assembly 150 rotated about ninety degrees from the orientation shown in FIGS. 2 and 3. Rotation of head assembly 150 via head rotation plate 153 may be used to rotate mounting arm 152, thereby changing the orientation of saw 140 and saw blade 141 for cutting material.

Figure 5:
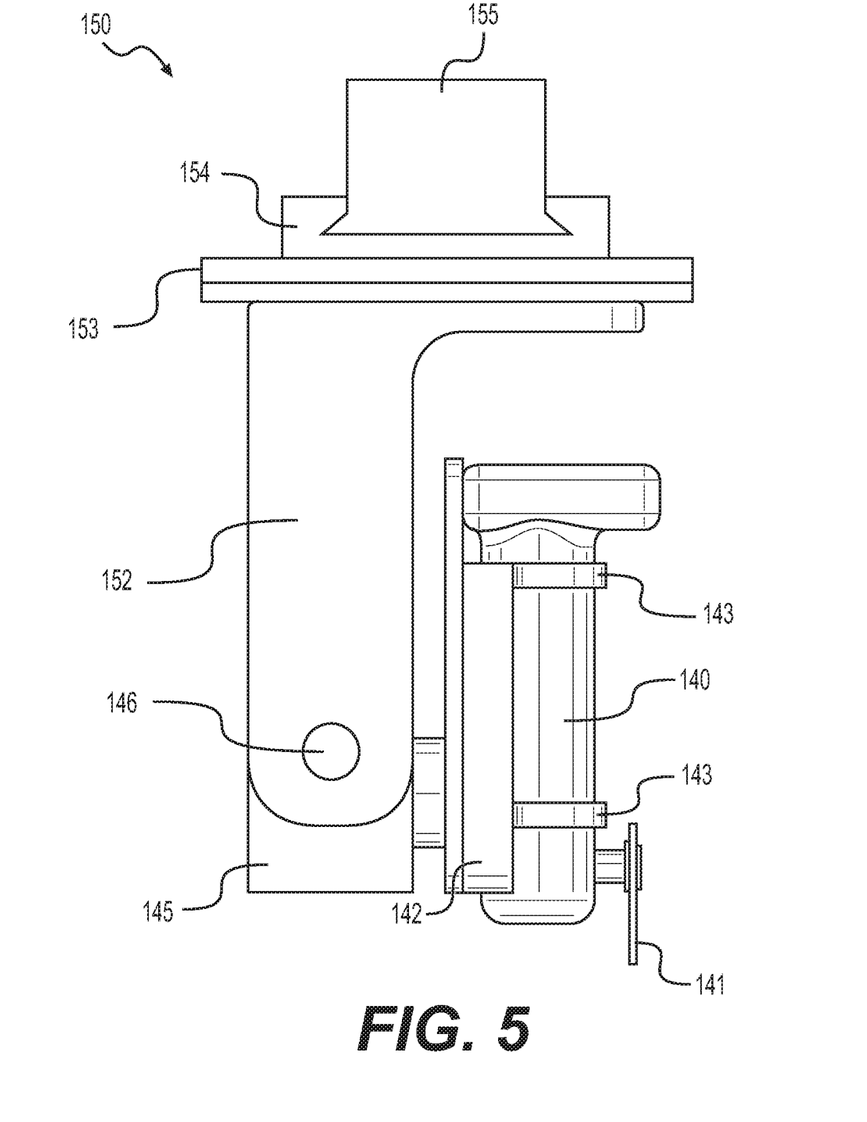
FIG. 5 is a side view of the head assembly of FIG. 4 showing a saw in a vertical orientation.
Figure 6:
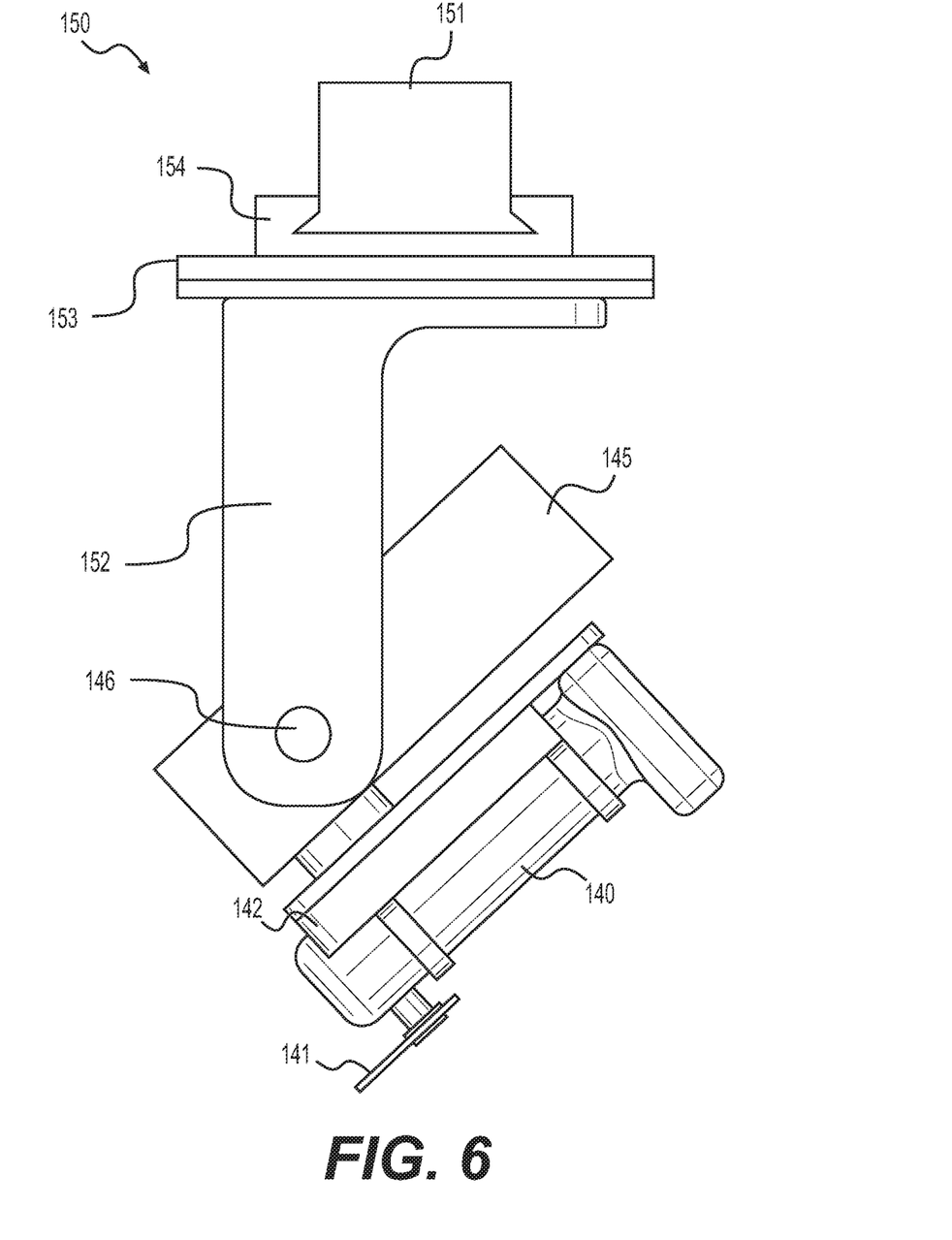
FIG. 6 is another side view of the head assembly of FIG. 4 showing a saw rotated to an angle of about forty-five degrees from vertical.
Figure 7:
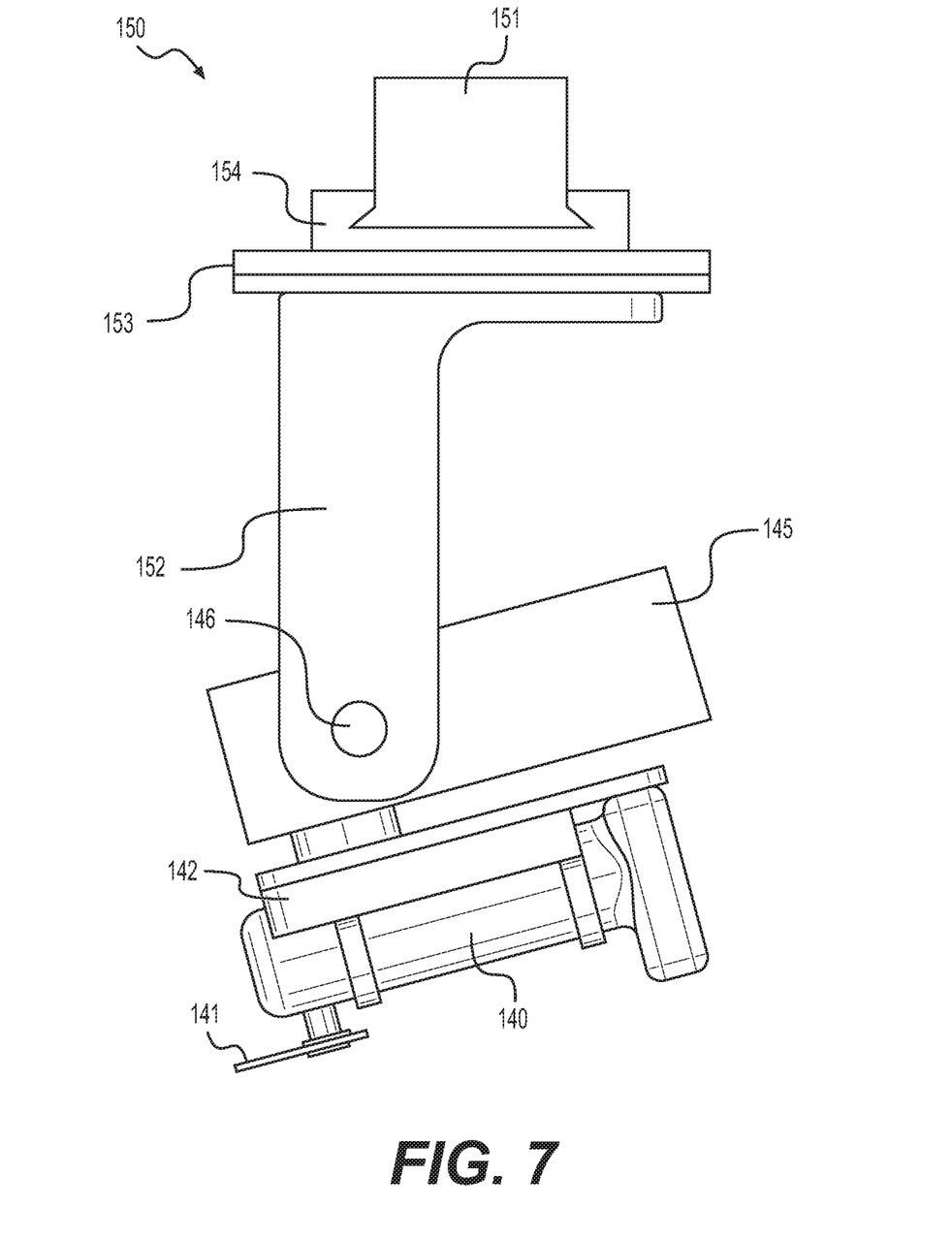
FIG. 7 is another side view the head assembly of FIG. 4 showing the saw rotated to an angle of about seventy-five degrees from vertical.

FIGS. 5-7 are side views of head assembly 150 and saw 140, and are best viewed together with the following description. Head assembly guide 155 is configured to align within grooves of mounting plate 154 enabling head assembly 150 to be moved along the length of head assembly guide 155. This extends the reach of saw 140 across material bed 130 in the transverse direction (e.g., across the width of composite material 120).

A mounting bracket 142 is configured for mounting saw 140 to two-axis gimbal 145. Saw 140 may be secured to mounting bracket 142 via one or more straps 143. Straps 143 may include ties, bands, clamps, etc. FIG. 5 shows gimbal 145 and saw 140 in a vertical or upright orientation. FIG. 6 shows gimbal 145 and saw 140 rotated about pivoting member 146 to an angle of about forty-five degrees from vertical. FIG. 7 shows gimbal 145 and saw 140 rotated about pivoting member 146 to an angle of about seventy-five degrees from vertical (i.e., about fifteen degrees from horizontal). The angled orientations shown in FIGS. 6 and 7 enable cutting composite material 120 at an angle to provide beveled edges for overlapping with adjoining edges for curing a plurality of material pieces together. For example, a first piece of composite material may be cut at a forty-five degree angle, and a second piece of composite material may be cut with a matching shape and a complimentary angle (e.g., a one-hundred thirty-five degree angle), such that the first and second pieces overlap for curing together.

Figure 8:
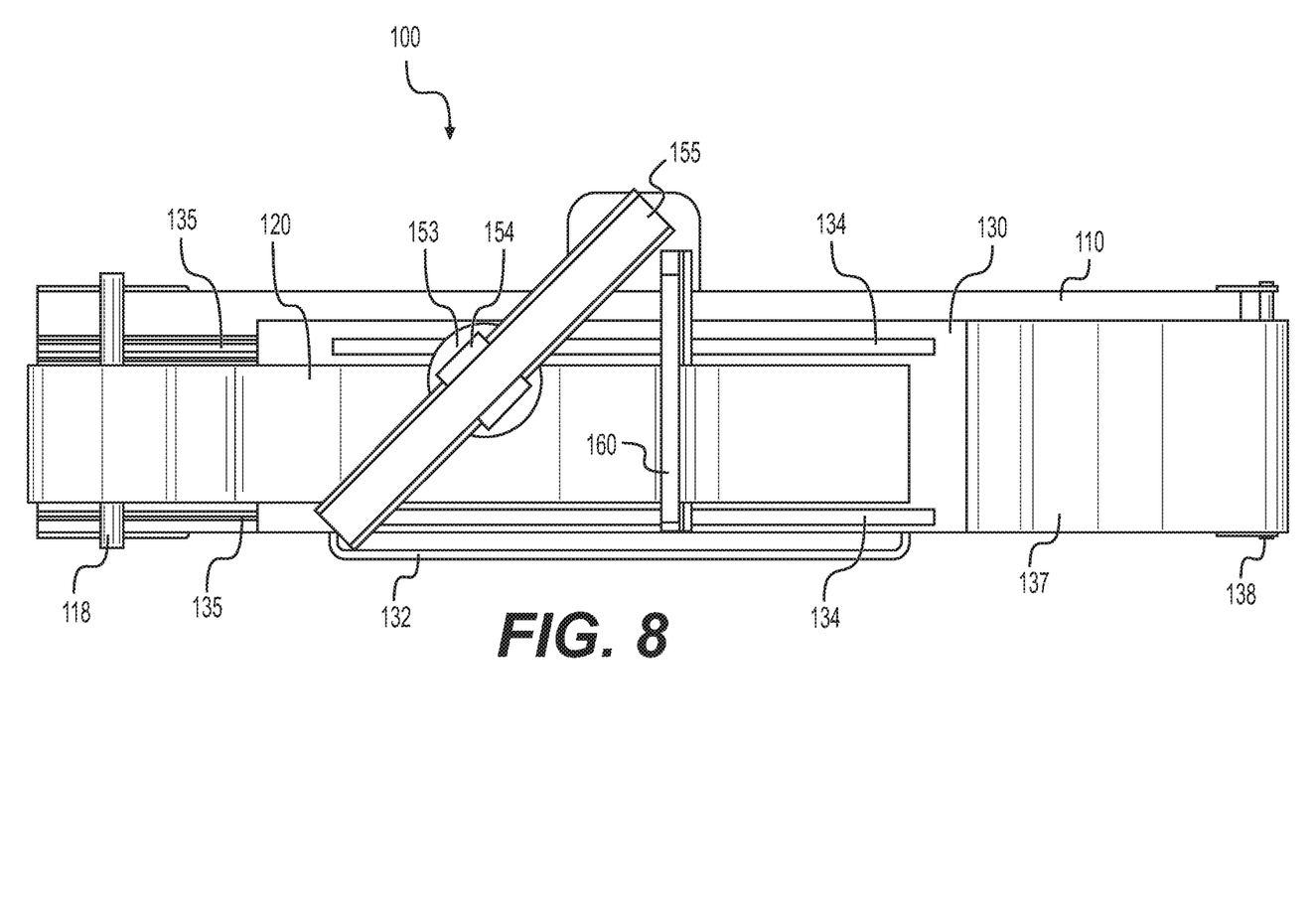
FIG. 8 is a top-down view of the system for cutting composite materials of FIG. 1 with the head assembly guide pivoted towards a first end of a material bed.
Figure 9:
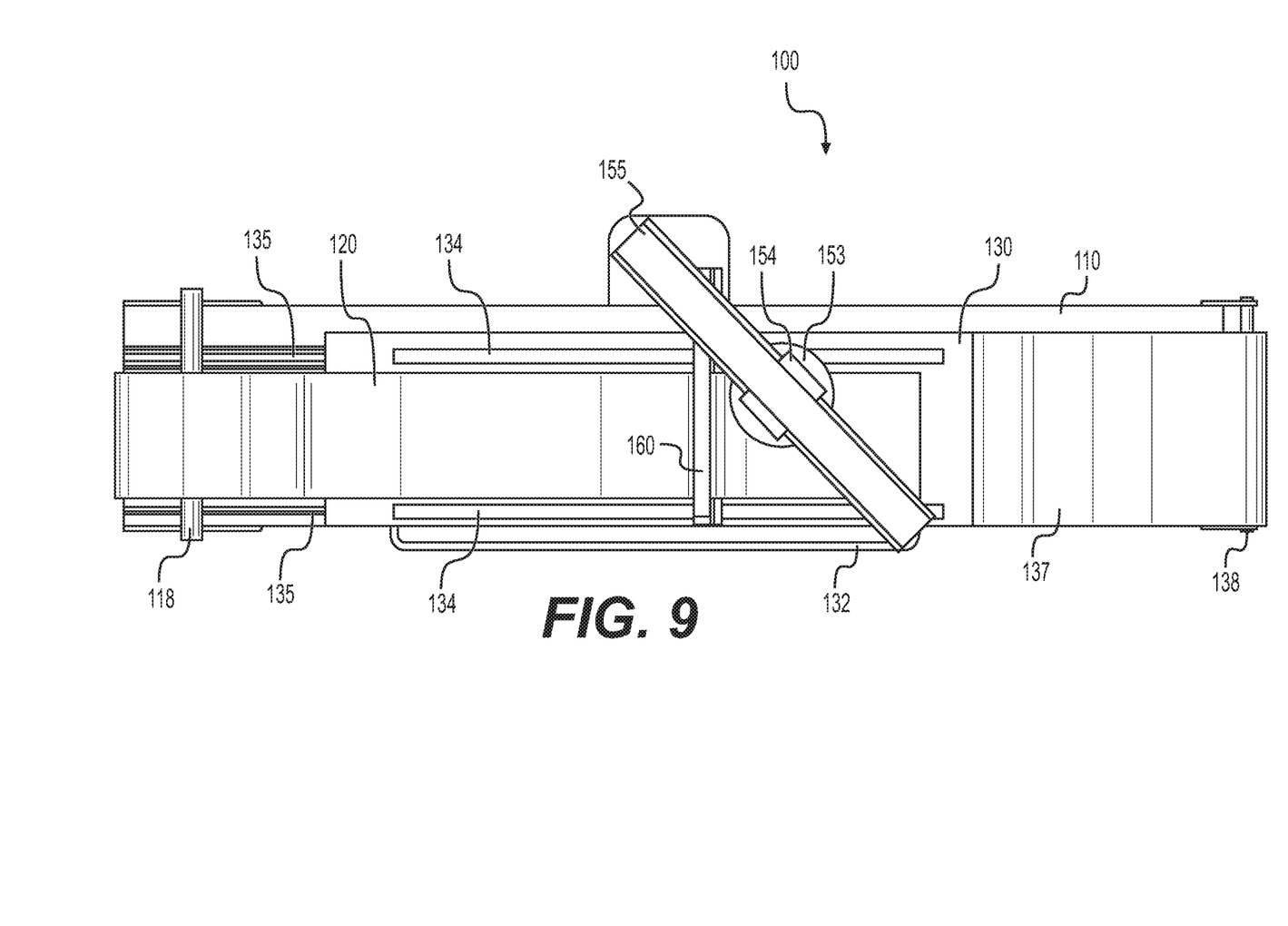
FIG. 9 is another top-down view of the system for cutting composite materials of FIG. 1 with the head assembly guide pivoted towards a second end of the material bed.

FIGS. 8 and 9 are top-down views of the system for cutting composite materials of FIG. 1, which are best viewed together with the following description. FIG. 8 shows head assembly guide 155 pivoted toward the first end of material bed 130. FIG. 9 shows head assembly guide 155 pivoted towards the second end of material bed 130. Pivoting of head assembly guide 155 provides further versatility for positioning saw 140 above different portions of composite material 120.

Cutting device 100 provides a plurality of degrees of freedom for positioning, orienting, and angling saw 140. For example, head assembly 150 is rotatable in a plurality of degrees of rotation, including any degree of rotation between zero and three-hundred sixty degrees. Head assembly guide 155 is rotatable in a plurality of degrees of rotation, such as from positive sixty degrees to negative sixty degrees (e.g., one-hundred twenty degrees) with respect to the transverse direction.

Figure 10:
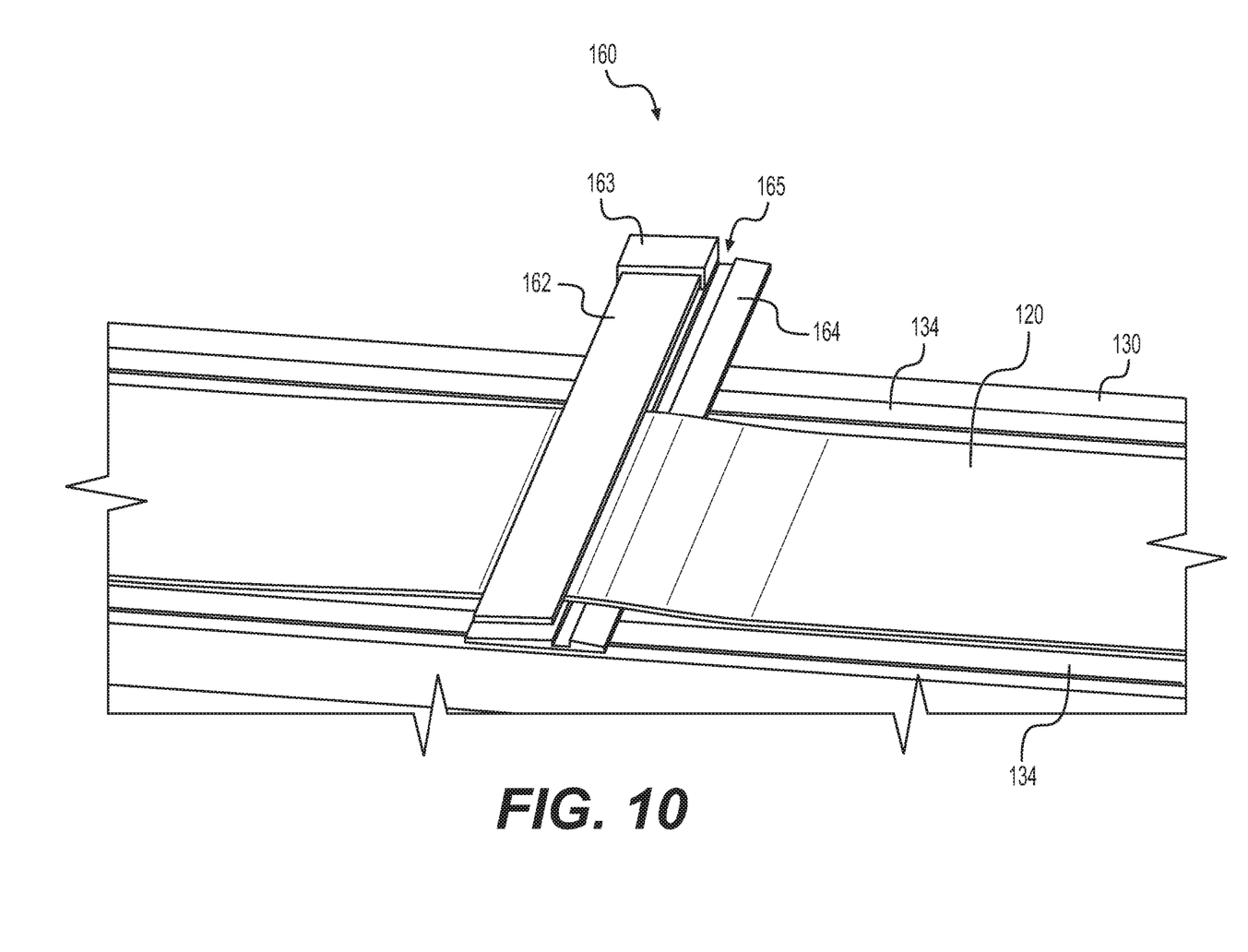
FIG. 10 is a perspective view of a material clamp, in an embodiment.

FIG. 10 shows a perspective view of material clamp 160, which includes a top member 162 located on top of material 120, and a bottom member 164 located beneath material 120. A bracket 163 is configured to hold top member 162 by one end such that top member 162 is aligned with bottom member 164. Bracket 163 further provides appropriate spacing between top member 162 and bottom member 164 to secure material 120 therebetween while cutting. In an embodiment, top member 162 is an acrylic member configured as a pressure foot to hold down material 120 to prevent slipping during the cutting action of saw 140.

Material clamp 160 is adjustable and may be held in place against material bed 130 by way of electromagnetic strips 134. For example, bottom member 164 may be formed of a ferromagnetic material such that a magnetic field produced via electromagnetic strips 134 provides a magnetic attraction between strips 134 and bottom member 164. Switching off electrical power to electromagnetic strips 134 halts the magnetic field, thereby releasing bottom member 164 to enable movement of material clamp 160. Material clamp 160 may be moved longitudinally along material bed 130 and it may also be pivoted to match the position of head assembly guide 155 (e.g., toward the first end of material bed 130, as shown in FIG. 8, or toward the second end of material bed 130, as shown in FIG. 9). Bottom member 164 includes a trough 165, which is configured to accommodate blade 141 as it cuts through material 120. Trough 165 is best viewed via FIG. 11.

Figure 11:
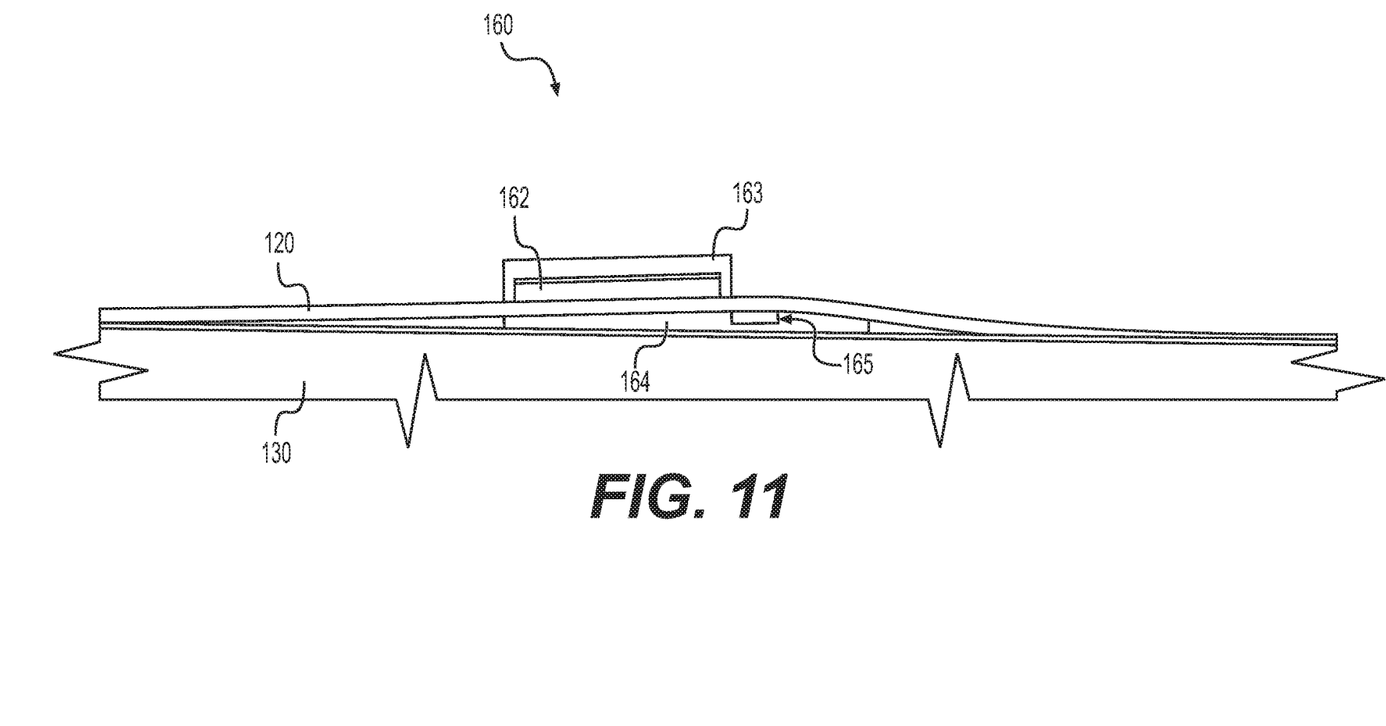
FIG. 11 is a cross-sectional side view the material clamp of FIG. 10.

FIG. 11 is a cross-sectional side view of composite material 120 sandwiched between top member 162 and bottom member 164 of material clamp 160. Top member 162 is configured to apply a downward pressure to a top side of material 120 for pressing it against bottom member 164 and firmly holding material 120 therebetween. This prevents slipping of material 120 to ensure precise cuts. Bottom member 164 may include angled portions on either side of trough 165 configured to bend material 120 upwards at trough 165 to further aid in the cutting process. Trough 165 is configured to receive blade 141 as it passes through composite material 120.

Figure 12:
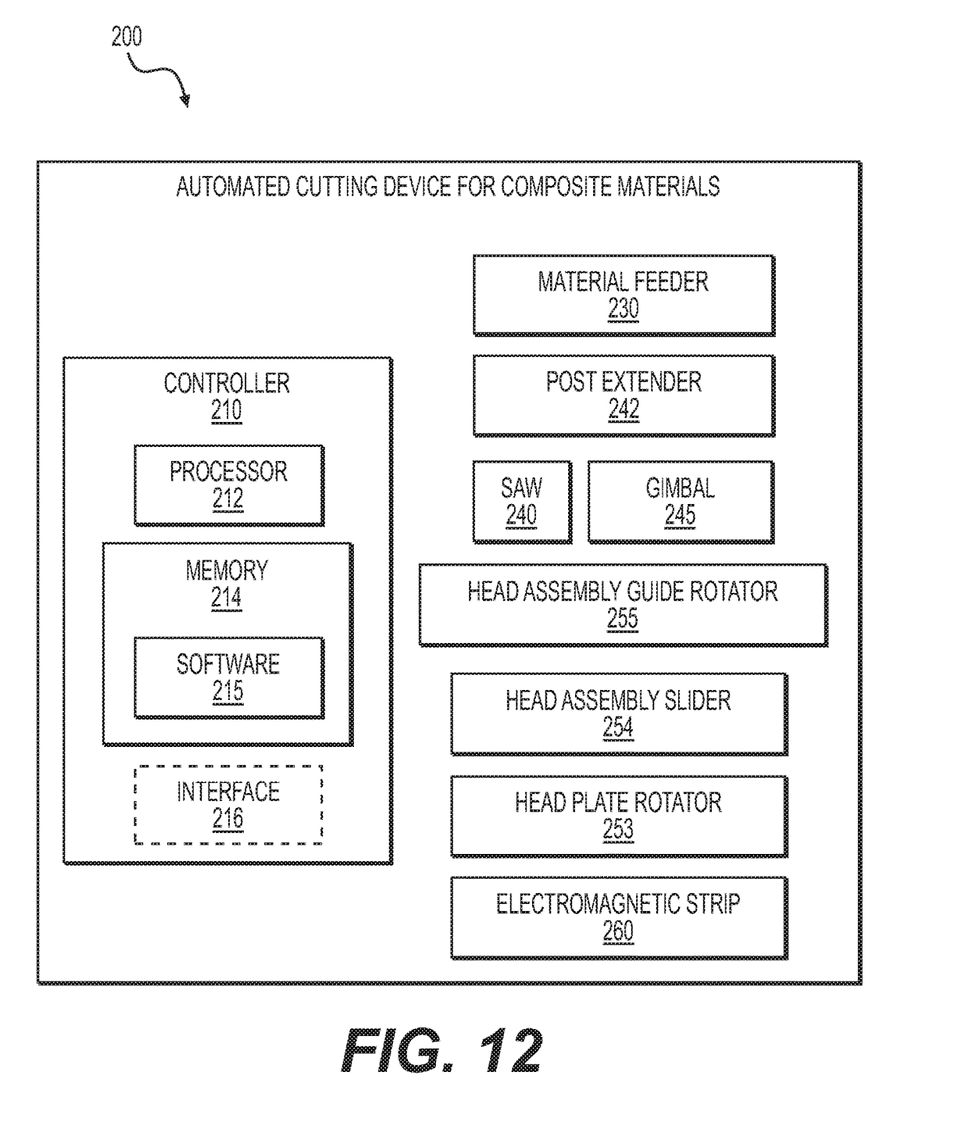
FIG. 12 is a block diagram of an automated cutting device for composite materials, in an embodiment.
Figure 13:
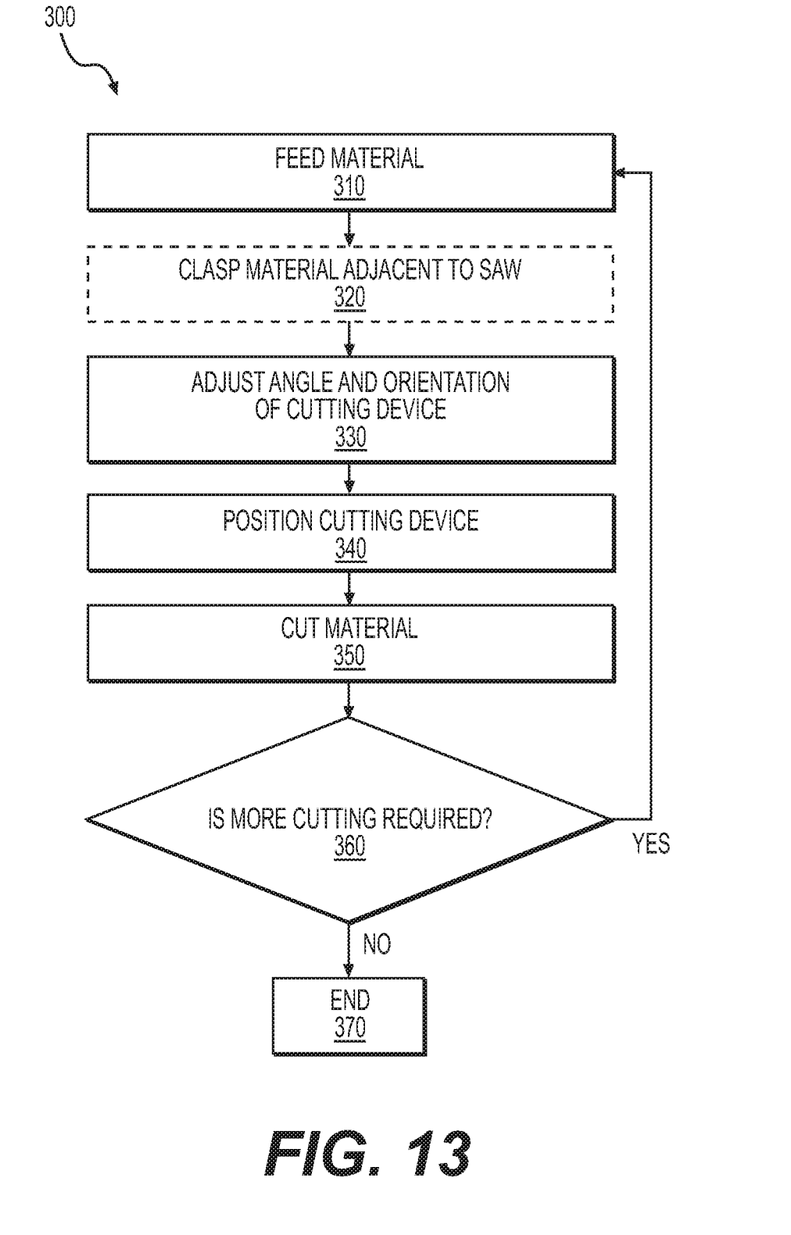
FIG. 13 is a block diagram showing steps of a method for cutting composite materials, in an embodiment.

FIG. 12 shows a block diagram of an exemplary automated cutting device 200 for composite materials. Automated cutting device 200 is an example of cutting device 100, FIG. 1 with a controller 210 configured to control various components of automated cutting device 200. Controller 210 may be used to automate one or more steps of a method for cutting composite material. An exemplary automated cutting method 300 is shown in FIG. 13 and described below.

Controller 210 is for example a computer, microcontroller, microprocessor, or programmable logic controller (PLC) having a memory 214, including a non-transitory medium for storing software 215, and a processor 212 for executing instructions of software 215. Controller 210 may further include an optional interface 216 for a user to transmit instructions and receive information. Interface 216 may enable the user to input instructions for adjusting system 200 thereby overriding or complementing any automatic instructions. Communication between controller 210 and components of system 200, which are described below, may be by one of a wired and/or wireless communication media.

A material feeder 230 is configured to feed composite material to the cutting device under control of controller 210. For example, material feeder 230 may include a material bed, similar to material bed 130, FIG. 1, that includes motorized rollers or a conveyor belt for moving composite material thereupon. The material bed may also be configured for moving (e.g., along rails 135). Composite material may be provided on a roll, such as roll 115, FIG. 1, which may be used to passively or actively feed material to the material bed. For example, rack 118 may include a motor for turning roll 115 to assist in feeding material to material bed 130. Interface 216 may be used to operate material feeder 230 by an operator for semi-automated material feeding.

A saw 240 is configured for cutting material, and a two-axis motorized gimbal 245 is configured for rotating saw 240, both under control of controller 210. Saw 240 is an example of saw 140, FIG. 1 and motorized gimbal 245 is a version of gimbal 145, FIG. 1 having motors. Software 215 may include instructions for operating motorized gimbal 245 (e.g., to pivot the angle of saw 240 for making beveled cuts, and to rotate saw 240 to use multiple portions of the saw blade's cutting edge) and for operating saw 240 (e.g., setting an oscillation rate). A post extender 242 is configured to raise and lower the post supporting the head assembly (e.g., post 112). For example, the post extender 242 may include a threaded portion and an electric motor (e.g., a stepper motor) to spin the threaded portion under control of controller 210, thereby raising and lowering of the post.

A head-plate rotator 253 is configured for rotating a head assembly (e.g., via head rotation plate 153), and a head-assembly-guide rotator 255 is configured for rotating a head assembly guide (e.g., head assembly guide 155). Head-plate rotator 253 and head-assembly-guide rotator 255 may include an electric motor (e.g., a stepper motor) for powering rotation under control of controller 210.

Electromagnetic strip 260 is configured for converting electrical power to a magnetic field for holding materials that are attracted to magnets (e.g., ferromagnetic materials, such as iron) by passing electrical current through a wire coil (e.g., a solenoid). A permanent magnet core may be located within the wire coil. Electromagnetic strip 260 is an example of electromagnetic strip 134 for holding material clamp 160 against material bed 130, as depicted in FIG. 10.

FIG. 13 shows steps of an exemplary method 300 for cutting composite materials. Method 300 may be performed manually using cutting device 100, FIG. 1 or method 300 may be automated by using cutting device 200, FIG. 2, for example. Alternatively, method 300 may be adapted for semi-automated use with an embodiment that combines features of cutting devices 100 and 200.

In a step 310, composite material is fed to the material bed. In an example of step 310, a sheet or roll of composite material 120 is placed on material bed 130.

In another example of step 310, material feeder 230 feeds composite material to the material bed. Material feeder 230 may include motorized rollers, a conveyor belt, or the like for automatically feeding material. Controller 210 may use processor 212 to execute instructions in software 215 for instructing material feeder 230 (e.g., to determine the rate at which material is fed).

In an optional step 320, the composite material is clasped adjacent to the saw. In an example of step 320, material clamp 160 is configured to clasp material 120 between lower member 164 and upper member 162, as illustrated in FIG. 10, for example. Clasping the material may aid in holding and guiding material 120 for performing precision cuts with saw 140. Material clamp 160 may be held in place via electromagnetic strips 134, which may be manually turned on/off via a switch, for example. Alternatively, electromagnetic strip 260 may be turned on/off via controller 210.

In a step 330, an angle and an orientation of the cutting device are adjusted. In an example of step 330, the angle and orientation of saw 140 are adjusted. Many different angle adjustments are possible. For example, gimbal 145 may be used to rotate saw 140 sideways such that different portions of blade 141 are used for cutting (see e.g., FIGS. 2 and 3). Rotating of blade 141 back and forth between the orientations shown in FIGS. 2 and 3 may be used to alleviate blade clogging (e.g., gumming of blade 141), by reducing buildup of resin from composite material 120. Head rotation plate 153 may be used to rotate saw 140 to change the cutting direction (see e.g., FIG. 4), and gearbox 145 may be used to tilt saw 140 forwards to adjust the cutting angle (see e.g., FIGS. 6 and 7).

In another example of step 330, processor 212 of controller 210 executes instructions provided by software 215 for adjusting the angle and orientation of saw 240. For example, gimbal 245 may tilt saw 240 sideways such that different portions of the saw blade are used for cutting (e.g., the orientation of saw 140 in FIGS. 2 and 3); head plate rotator 253 may rotate saw 240 to change the cutting direction (e.g., the rotation of saw 140 in FIG. 4); gimbal 245 may tilt saw 240 forwards to adjust the cutting angle (e.g., the tilt of saw 140 in FIGS. 6 and 7).

In a step 340, the cutting device is positioned. In an example of step 340, saw 140 is positioned above material bed 130. For example, head assembly guide 155 may be pivoted towards the first end of material bed 130 (see e.g., FIG. 8) or towards the second end of material bed 130 (see e.g., FIG. 9); and, head assembly 150 may be slid longitudinally along head assembly guide 155. The height of saw 140 may be positioned by adjusting the height of head assembly guide 155 along post 112, thereby controlling the depth that blade 141 cuts through material 120.

In another example of step 340, controller 210 controls positioning of saw 240. For example, saw 240 may be positioned using head assembly guide rotator 255, which may include a motor to rotate the head assembly guide under control of controller 210. Similarly, saw 240 may be positioned using head assembly slider 254, which may include a motorized pulley with cables, for example, to move the head assembly longitudinally along the head assembly guide. Also, the height of saw 240 may be positioned using post extender 242 raising and lowering the post that supports the head assembly under control of controller 210.

Steps 330 and 340 collectively serve to position an oscillating saw blade by using a guiding mechanism. The guiding mechanism may include gimbal 145, head assembly 150, rotation plate 153, head assembly guide 155. Alternatively, the guiding mechanism may include gimbal 245, head assembly 250, rotation plate 253, head assembly guide 255, and post extender 242.

In a step 350, the material is cut. In an example of step 350, composite material 120 is cut via blade 141 of saw 140. While a cut is being performed, saw 140 may be guided to extend the cut (e.g., head assembly 150 may slide along head assembly guide 155), or to angle the cut across the material (e.g., by rotating head assembly guide 155), or to change the direction of the cut (e.g., by spinning head assembly 150 via head rotation plate 153). Material 120 may be continuously fed to cutting device 100 while saw 140 is actively cutting. In other words, the oscillating saw blade may be moved in a direction based on the guiding mechanism (e.g., head assembly guide 155 and head assembly 150) for cutting the woven composite material 120.

In another example of step 350, processor 212 of controller 210 executes instructions provided by software 215 for saw 240 to oscillate at a predetermined speed, for head assembly guide rotator 255 to rotate the head assembly guide, for head assembly slider 254 to slide the head assembly, head plate rotator 253 to rotate saw 240, and material feeder 230 to feed composite material. Controller 120 may instruct a plurality of these components to operate in a coordinated manner to guide saw 240 for performing complicated and precise cutting of the composite material.

In certain embodiments, an edge of material is cut (e.g., to produce an angled or beveled edge). This may be performed by an operator or via an automated routing. For example, controller 210 is configured to guide saw 240 along a material edge for cutting via one or more of head assembly guide rotator 255, head assembly slider 254, head plate rotator 253, and material feeder 230.

A step 360 is a decision. If in step 360, it is determined that more cutting is required, method 300 returns to step 310 to continue feeding the material. Otherwise, method 300 proceeds to step 370 to end. Optionally, the material may be fed to way cover 137 for removal.

Embodiments of the present disclosure provide a system and method that provide straighter cut lines compared to those made using a hand-held saw. Due to this improvement, when two cut pieces are laid out and overlapped along adjoining edges, the improved trueness in cut provides a more uniform and minimized overlap width, which reduces material costs.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

The invention claimed is:

1. A system for cutting a composite material, the system comprising:
    a material supporting surface;
    an oscillating saw suspended from a rotatable head on an arm;
    a two-axis gimbal coupled to the rotatable head for adjusting a cutting angle of the oscillating saw; and
    a clamp arrangement for guiding and holding the composite material to prevent the composite material from slipping while being cut with the oscillating saw, wherein the clamp arrangement further includes a trough for receiving the oscillating saw blade as it cuts through the composite material.

2. The system of claim 1, wherein the rotatable head enables a plurality of degrees of rotation of the oscillating saw.

3. The system of claim 1, wherein the rotatable head is slidably mounted on the arm for sliding the oscillating saw along a length of the arm.

4. The system of claim 3, wherein the arm and the rotatable head are adapted to guide a blade of the oscillating saw to cut the composite material.

5. The system of claim 1, wherein the two-axis gimbal is configured to rotate the oscillating saw along a first axis to adjust the cutting angle of the oscillating saw for producing beveled cuts.

6. The system of claim 5, wherein the two-axis gimbal is further adapted to rotate the oscillating saw along a second axis, perpendicular to the first axis, for engaging a plurality of portions of a cutting edge of the blade.

7. The system of claim 1, wherein the material support surface is moveable along rails for positioning the composite material under the oscillating saw.

8. The system of claim 1, wherein the material support surface includes an electromagnetic strip and the clamp arrangement includes a magnetic material such that the electromagnetic strip magnetically attracts the magnetic material to hold the composite material in place.

9. An automated system for cutting a composite material, the system comprising:
an oscillating saw suspended from a rotatable head on an arm;
a two-axis motorized gimbal coupled to the rotatable head for adjusting a cutting angle of the oscillating saw;
a clamp arrangement having a magnetic portion and a material supporting surface having an electromagnetic strip, wherein the magnetic portion and the electromagnetic strip are adapted to hold the composite material therebetween for preventing the composite material from slipping while being cut with the oscillating saw; and
a controller having a memory, including a non-transitory medium for storing software, and a processor for executing instructions of the software, the software comprising instructions to cut the composite material by guiding the oscillating saw via coordinated movement of the rotatable head, the arm, and the two-axis motorized gimbal.

10. The automated system of claim 9, wherein the controller controls an oscillation rate of the oscillatory saw.

11. The automated system of claim 9, further comprising a material feeder configured to feed the composite material to the oscillating saw for continuously cutting the composite material.

12. A method of cutting a woven composite material, wherein the woven composite material includes layered strips of quazi-isotropic material, the method comprising:
feeding the woven composite material on a support surface;
positioning an oscillating saw via a guiding mechanism; and
cutting the woven composite material by moving a blade of the oscillating saw in a direction based on the guiding mechanism.

13. The method of claim 12, wherein moving the oscillating saw blade via the guiding mechanism comprises rotating a head assembly arm and sliding a head assembly along the head assembly arm, wherein the oscillating saw is coupled to the head assembly arm via the head assembly.

14. The method of claim 12, further comprising clasping the woven composite material, prior to the step of cutting the material, to prevent slipping of the material while cutting.

15. The method of claim 12, further comprising rotating the oscillating saw blade to engage a plurality of portions of a cutting edge of the saw blade.

16. The method of claim 12, further comprising angling the oscillating saw blade to cut the woven composite material at an angle that produces a beveled edge.

17. The method of claim 12, further comprising angling the oscillating saw blade at a first angle to cut a first beveled edge in a first piece of the woven composite material, and angling the oscillating saw blade at a second angle, complimentary to the first angle, to cut a second beveled edge in a second piece of the woven composite material, such that the first beveled edge may overlap the second beveled edge for curing the first piece together with the second piece.

18. The method of claim 12, further comprising curing the woven composite material after said cutting step to form a tooling surface.

19. The method of claim 12, further comprising automatically performing the steps of feeding the material, positioning the oscillating saw blade, and cutting the material based on instructions provided by a controller having a memory, including a non-transitory medium for storing software, and a processor for executing instructions of the software.

* * * * *